June 17, 1958   G. S. KIDO   2,839,102
DUST COLLECTING ATTACHMENTS FOR POWER SAWS
Filed March 6, 1957   3 Sheets-Sheet 1

INVENTOR
GEORGE S. KIDO
BY Albert H. Kirchner
ATTORNEY

June 17, 1958 G. S. KIDO 2,839,102
DUST COLLECTING ATTACHMENTS FOR POWER SAWS
Filed March 6, 1957 3 Sheets-Sheet 2

INVENTOR
GEORGE S. KIDO
BY Albert H. Kirchner
ATTORNEY

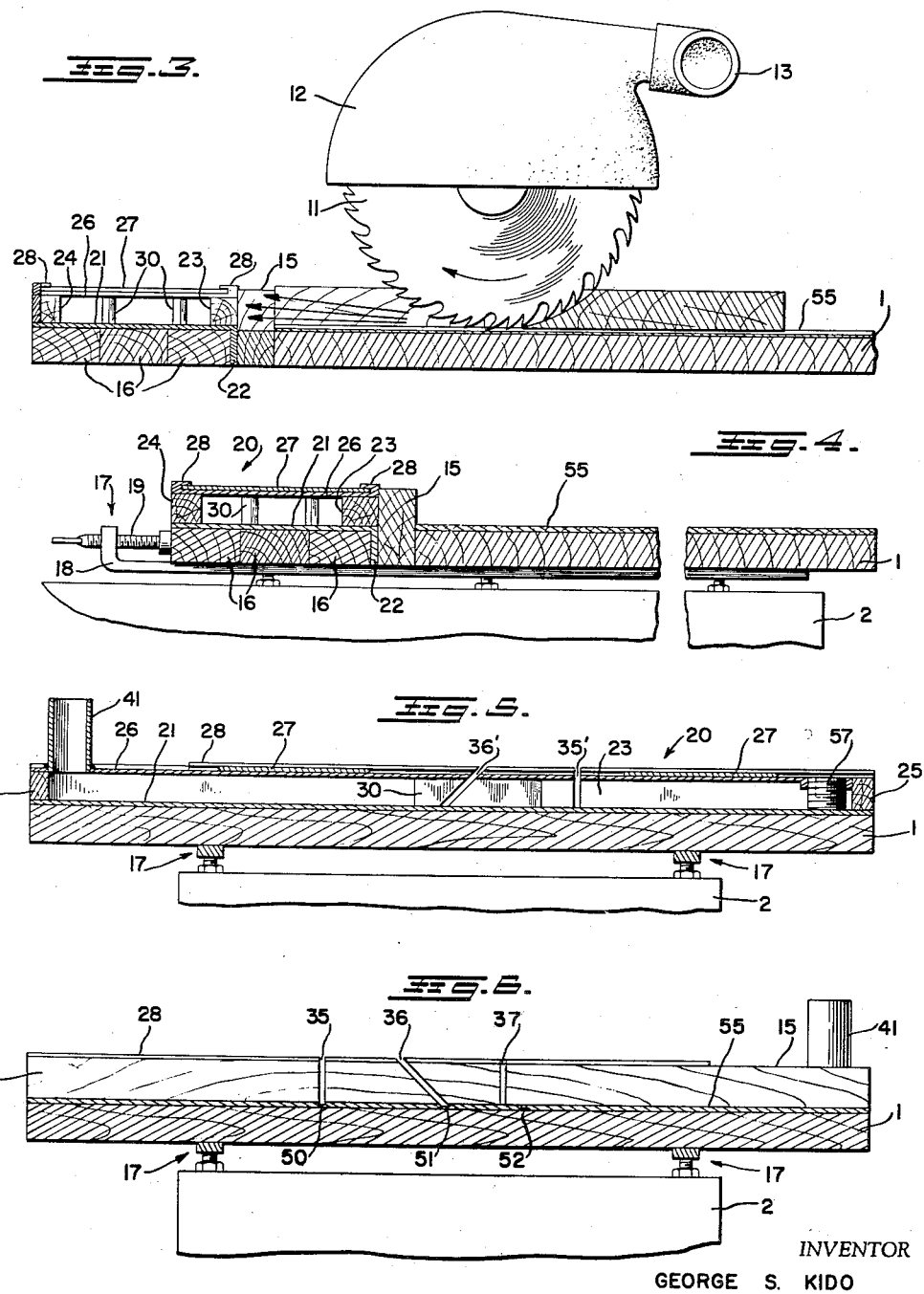

United States Patent Office 2,839,102
Patented June 17, 1958

2,839,102

DUST COLLECTING ATTACHMENTS FOR POWER SAWS

George S. Kido, Madison, Wis.

Application March 6, 1957, Serial No. 644,264

8 Claims. (Cl. 143—157)

The present invention relates to power saws of the circular blade type and more particularly to a dust collecting attachment for such saws.

Circular blade power saws of the type for which the present invention is especially designed generally comprise a horizontal table bed on which the material to be cut, such as a piece of wood, is positioned against a backstop called a guide fence. An assembly of electric motor and a circular saw blade rotated by the motor, mounted on an arm extending over the table, is then pulled from behind the fence, through the workpiece to be cut. The cut made forwardly from the fence may be a straight cross cut, a bevel cross cut, a miter, or a bevel miter. In each case sawdust generated by the cutting operation is projected in a stream rearwardly toward the fence through the lengthening cut in the workpiece as the blade moves forwardly therethrough. The object of the present invention is to effect a quite complete collection of the sawdust and dispose of it into a waste receptacle.

The most successful previous attempts to accomplish the foregoing object have comprised covering the upper portion of the blade with a protective guard or hood and applying suction to such hood for the purpose of aspirating into it, and thence into a suction tube connected to it, the sawdust produced as the cut proceeds. These constructions have not been entirely satisfactory because they have not succeeded in pulling all the sawdust into the suction stream. A considerable portion, including particularly the troublesome fine dust, is projected backwardly through the lengthening kerf as the blade moves forwardly through the wood and, escaping the hood, does not enter the suction tube but is scattered into the atmosphere.

The present invention aims to overcome the inefficiency of such prior art devices and produce a dust collecting appendage for sawing equipment of the class indicated which positions a special suction receptor directly in the path of the stream of sawdust issuing from the teeth of the blade, thus taking advantage of the direction in which the stream inherently tends to move and augmenting that movement by suction in the receptor.

A further feature of the construction provided by the invention is the attachment of a waste receptacle in the suction line for the purpose of accumulating the collected dust, thus making it unnecessary to vent the suction line to the exterior or to direct it long distances to a dumping ground.

Incidental objects of the invention are to provide a dust collecting attachment of low initial cost and simple construction, capable of long life at unimpaired efficiency, which can be readily attached to existing equipment with a minimum of difficulty.

Other objects and advantages will be evident to those skilled in the art from a consideration of the embodiment of the invention illustrated in the accompanying drawings which has been thoroughly tested in actual practice and found to give entirely satisfactory results so that it is at present preferred among the numerous forms in which the invention may be incorporated.

In the drawings,

Fig. 3 is a transverse vertical sectional view taken on the line 3—3 of Fig. 2, showing the saw blade in its relationship to the table bed, workpiece and receptor;

Fig. 4 is a similar view, taken on the line 4—4 of Fig. 2, omitting the workpiece and saw blade;

Fig. 5 is a lengthwise vertical sectional view taken along the line 5—5 of Fig. 2; and Fig. 6 is a similar view taken along the line 6—6 of Fig. 2.

Figure 1:
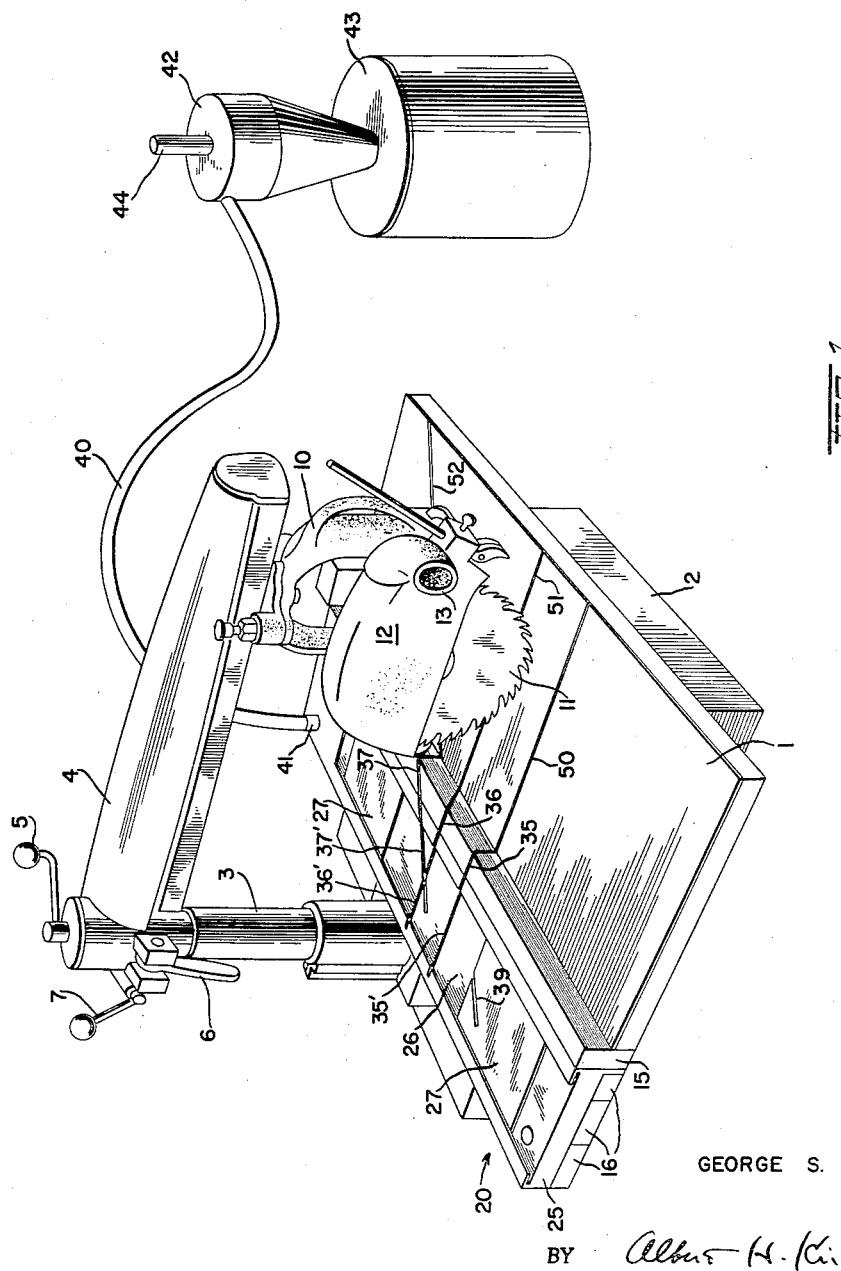
Figure 1 is a perspective view of the preferred form of the invention shown applied to a radial arm type of power saw.

Broadly speaking, the principal objects of the invention are accomplished, in an attachment for power saws of the type indicated, by mounting behind the standard guide fence at the rear of the table bed a hollow receptor having slotted openings aligned with the kerfs in the guide fence, with which in turn the cuts that are made in the workpiece will become aligned, and applying suitable suction to the receptor so as to withdraw therefrom sawdust which has been pulled by the same suction from the cut in the workpiece, through one of the kerfs in the guide fence.

The drawings show the invention applied to a power saw of the radial arm type. In such equipment a smooth surfaced bed 1 of hard wood is mounted on a table top 2 from the rear center of which rises a stout metal standard or column 3 on which is mounted a horizontally extending radial arm 4. In any convenient manner, forming no part of the present invention, the column is arranged for adjustably fixing the arm at selected elevations above the bed 1 and for adjustably fixing it to project at along selected radii of the column, i. e., at various angles to the parallel front and back edges of the table bed. These adjustments may include actuating and fixing means such as the handle 5 for raising or lowering the arm by means of suitable gearing (not shown) cooperating with telescopically related sections of the column, a latch 6 for setting the arm at any selected radius (for straight cross cutting or mitering cuts), and a handle 7 operating clamping means for fixing the arm at the selected, latched angle.

Mounted on the radial arm 4, for movement lengthwise along ways in the arm, is a carriage element from which depends a frame structure 10 carrying a circular saw blade 11 journaled in the frame and driven by an electric motor (not shown in the drawing, being behind the blade in Fig. 1). All this construction is conventional and well known, as is also a standard type of hood or guard 12 which is mounted on the frame so as to cover the upper portion of the blade 11.

The hood or guard 12 contains an outlet orifice or nozzle 13 which is intended to deflect sawdust produced during ripping cuts, which are made by turning the blade 90° from the position shown in Fig. 1, for which purpose the frame 10 is mounted on a swivel connection to the carriage.

The bed 1 is made of suitable hardwood and is bounded at its rear by a guide fence 15 best made of some softer wood in the form of an accurately proportioned narrow strip which in the conventional structure is clamped in position between the bed 1 and one or more relatively narrow spacer boards 16 by means of clamps 17 (Fig. 5). Each of these clamps may be provided in the form of a metal bracket 18 bolted to the under side of the bed 1 and having wing screws 19 threaded into their upstanding rear ends, as shown in Fig. 4.

In the conventional structure the fence 15 is adapted to be positioned between the assembly of spacer boards 16 and the bed 1, or between any two of the spacer boards, so as to adjust the effective width or depth of the bed to suit the work that is to be cut.

The present invention provides a receptor generally designated 20 which is insertible behind the guide fence 15 for the purpose of receiving dust generated by the sawing operation. This receptor is best made in the form of an oblong boxlike housing or casing having a bottom 21 provided with an integral depending front flange 22 and having front and rear walls 23, 24, respectively, and end walls 25, all covered by a top sheet 26. The front, rear and end walls may be made of wood, in somewhat the same manner as the guide fence 15. The bottom 21 and its flange 22 are preferably made of plastic, as is the top sheet 26, since these portions are best provided in the form of thin sheet material.

A pair of top slides 27, in the form of sheets of material such as the plastic that is preferred for the bottom 21 and top 26, is mounted on the top 26 for sliding movement lengthwise of the receptor in channel runways 28, 28 formed along the front and rear edges of the top 26. Support may be provided for the top 26, and hence also for the slides 27, by posts or studs 30, 30, particularly where the length of the bed is such as to make the span of the top 26 of the receptor quite long between the end walls 25.

It is to be understood that the material, or specific manner of fabrication, of the receptor casing forms no part of the invention. "Masonite" or other compressed fibre or hardboard composition is suitable, as are also sheet metal and plastic sheet material. It is contemplated also that the casing, or a large portion of it, may be blow molded in one piece out of extrusion grade polyethylene.

The guide fence 15 is formed with kerfs through which the saw blade 11 is pulled in order to make the several standard cuts, such as a direct cross cut, a miter cut, a bevel cut, etc. Thus, in the illustrated embodiment of the invention the fence 15 is shown provided with a straight cross cut kerf 35, a bevel kerf 36, and a miter kerf 37.

Of course the guide fence may have other kerfs formed in it since the radial arm 4 can be adjustably fixed at various angles to the parallel front and back edges of the table bed and each of these angles results in a corresponding separate kerf in the guide fence. In actual practice these kerfs range from 90° to these parallel edges (which provides a straight cross cut, producing the kerf 35) to one of about 20°. It is not deemed necessary to illustrate all of these possible kerfs.

The top 26 of the receptor is similarly kerfed, in alignment with each of the guide fence kerfs, as shown at 35', 36' and 37', each of these kerfs being aligned with the corresponding kerf in the guide fence and being continuous through the front wall 24 of the receptor.

It will be understood that with the slides 27 withdrawn so as to uncover the appropriate kerf 35', 36' or 37' in the top 26, the saw blade 11 may be set in the selected kerf, and may be pulled through the aligned kerfs in the front wall of the receptor and in the guide fence, and thence through the workpiece engaged against the front of the guide fence and seated on the bed 1, so as to make the desired cut in the workpiece.

During this cutting operation, as the cut proceeds from rear to front through the workpiece, sawdust is discharged in a stream through the lengthening cut in the workpiece. The stream is directed naturally toward the kerf in the guide fence and the aligned kerfs in the front wall and top of the receptor. The tendency of the sawdust stream to enter the kerfs in the receptor is, according to the present invention, substantially increased by providing the receptor with suction means in the form of a tube 40, such as a flexible hose, connected to a nipple 41 at one end of the receptor and having its other end connected to the suction hose of an ordinary household vacuum cleaner (not shown). It is desirable and convenient to interpose between the vacuum cleaner and the hose 40 some sort of receptacle for trapping and holding the dust, such as the cyclone type separator shown at 42, surmounting a waste can 43 and having a short upstanding tube 44 for receiving the vacuum cleaner suction hose.

In operation it is found that suction transmitted through the hose 40 to the receptor effectively pulls sawdust into the receptor and thence out through the hose for deposit in the can 43. The suction is augmented considerably by operating the slides 27 so as to cover those of the kerfs 35', 36', 37' in the receptor top 26 which are not in use. In Fig. 1 the slides 27 are shown retracted for clarity of illustration, but in actual use they will be disposed so as to cover one or another of the kerfs in the receptor top 26. For this purpose one of the slides 27 is kerfed obliquely, as shown at 39 in Figs. 1 and 2, for alignment with the miter kerf 37' in the receptor top 26 when a miter cut is to be made, at which time the kerfs 35' and 36' will be covered by the slides 27. Similarly, it will be understood, the kerf 35' or 36' will be exposed and the other two covered by appropriately adjusting the slides when cuts are to be made through the kerfs 35 or 36 in the guide fence 15.

In Fig. 1 the bed 1 is shown with shallow grooves 50, 51, 52 aligned with the several kerfs in the guide fence. These grooves are normally produced in the bed by the setting of the saw blade 11 sufficiently low on the column 3 to be certain to cut entirely through a workpiece positioned on the bed. With the receptor installed on the spacer boards 16, which are flush with the table bed 1, such a setting of the blade would necessarily make cuts in the bottom 21 of the receptor like the cuts 50, 51, 52 in the bed. To prevent such cutting of the bottom it is useful to elevate the blade 11 slightly so as to clear the bottom 21 and interpose a sheet of plywood 55, somewhat thicker than the bottom 21, between the bed 1 and the workpiece. This sheet 55 then takes the cuts 50, 51, 52 and the bottom 21 is protected.

Figure 2:
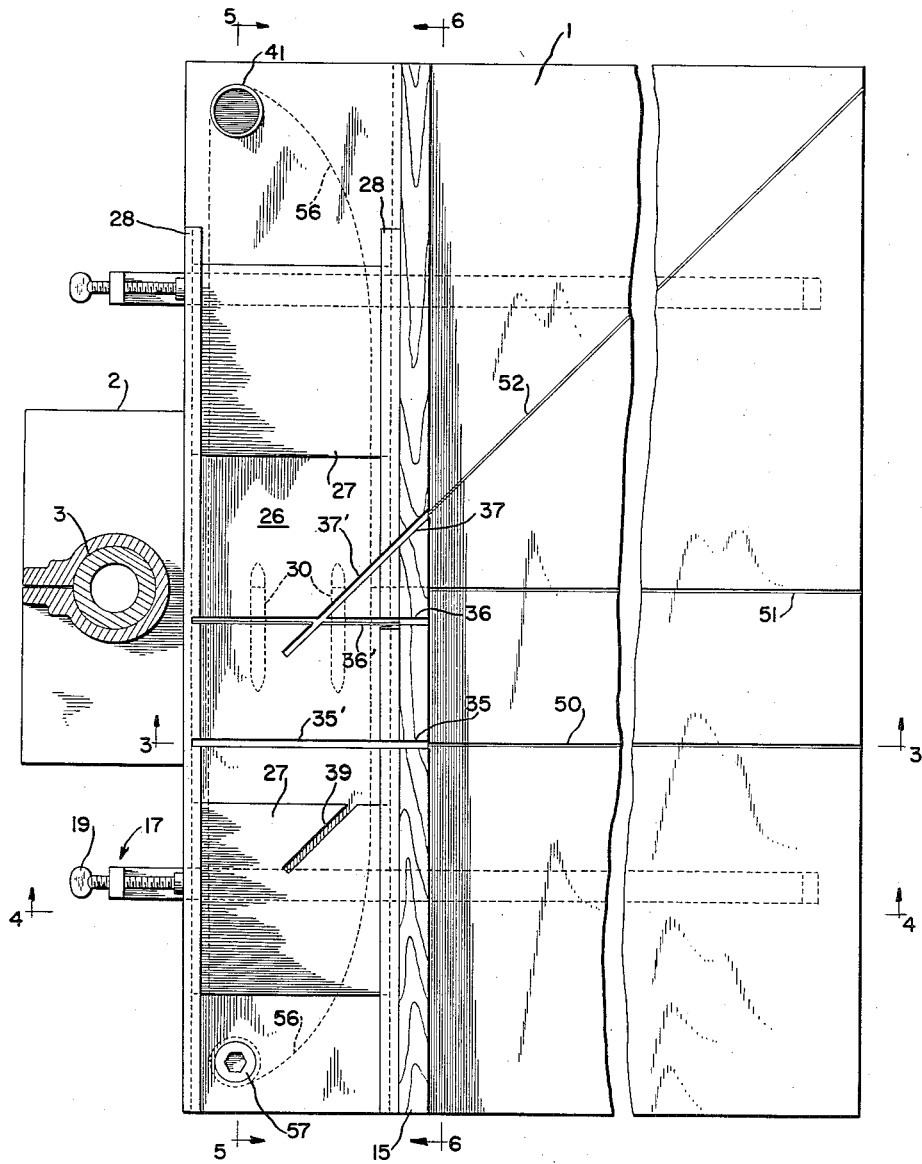
Fig. 2 is a horizontal sectional view taken through the arm-supporting standard, showing in top plan view the table bed and the receptor provided by the invention.

Fig. 2 shows a desirable contour 56 for the inner end zones of the receptor that has been found to facilitate exhaustion of the dust by eliminating what would otherwise be relatively dead air spaces in the end corners of a rectangular chamber.

Fig. 2 also shows a pair of outlets, one at each end of the receptor, the one in use at the time having the nipple 41 installed and the other being closed by a plug 57.

The embodiment of the invention that has been described and depicted in this application is one that has been reduced to actual practice and found to be entirely satisfactory and hence is at present preferred. The disclosure of this embodiment is made merely to exemplify the invention. The principles of the invention are capable of being embodied in other and further modified forms all of which, to the extent that they incorporate the structures and combinations defined by the broader of the appended claims, are to be deemed within the scope and purview thereof.

I claim:

1. A dust collecting attachment for power saws of the type in which a rotating circular blade is pulled through a workpiece from behind a kerfed guide fence, said attachment comprising a hollow casing adapted to be positioned behind the guide fence and having a kerfed front wall engaged with the guide fence, the kerf in said front wall being adapted to be aligned with the kerf in the guide fence for admitting sawdust into the casing from the kerf in the guide fence, in combination with an exhaust port formed on the casing for connection of suction means for exhausting sawdust therefrom.

2. A dust collecting attachment for power saws of the type in which a rotating circular blade is pulled through a workpiece from behind a kerfed guide fence, said attachment comprising a hollow casing adapted to be positioned behind the guide fence and having a kerfed front wall engaged with the guide fence, the kerf in said front wall being adapted to be aligned with the kerf in the guide fence for admitting sawdust into the casing from the kerf in the guide fence, in combination with suction means connected to the hollow interior of the casing for exhausting sawdust therefrom.

3. Power saw apparatus comprising a horizontal bed having a kerfed guide fence at its rear, a rotatable circular saw blade mounted for pulling through said kerf and across the bed in cutting relation to a workpiece mounted on the bed, a hollow casing positioned behind the guide fence and having a kerfed front wall engaged with the guide fence with the kerf in said front wall aligned with the kerf in the guide fence for admitting sawdust into the casing from the kerf in the guide fence, and an exhaust port formed on the casing for connection of suction means for exhausting sawdust therefrom.

4. Power saw apparatus comprising a horizontal bed having a kerfed guide fence at its rear, a rotatable circular saw blade mounted for pulling through said kerf and across the bed in cutting relation to a workpiece mounted on the bed, a hollow casing positioned behind the guide fence and having a kerfed front wall engaged with the guide fence with the kerf in said front wall aligned with the kerf in the guide fence for admitting sawdust into the casing from the kerf in the guide fence, and suction means connected to the hollow interior of the casing for exhausting sawdust therefrom.

5. A dust collecting attachment for power saws of the type in which a rotating circular blade is pulled through a workpiece from behind a guide fence having a plurality of kerfs, said attachment comprising a hollow casing adapted to be positioned behind the guide fence and having a front wall engageable with the guide fence and having a plurality of kerfs therein adapted to be aligned with the kerfs in the guide fence for admitting sawdust into the casing from the kerfs in the guide fence, in combination with an exhaust port formed on the casing for connection of suction means for exhausting sawdust therefrom and a closure movably mounted on said casing to cover and close selected kerfs in said casing.

6. A dust collecting attachment for power saws of the type in which a rotating circular blade is pulled through a workpiece from behind a guide fence having a plurality of kerfs, said attachment comprising a hollow casing adapted to be positioned behind the guide fence, having a front wall engageable with the guide fence and having a top, said top and front wall being provided with a plurality of kerfs adapted to be aligned with the kerfs in the guide fence for admitting sawdust into the casing from the kerfs in the guide fence, in combination with an exhaust port formed on the casing for connection of suction means for exhausting sawdust therefrom, and closure means movably mounted on said top to cover and close selected kerfs in said top.

7. A dust collecting attachment as claimed in claim 6, in which the closure means comprises a slide movable lengthwise along the casing top.

8. A dust collecting attachment as claimed in claim 6, in which the closure means comprises a pair of slides mounted in the same plane in engagement with the casing top and movable from opposite ends of the casing top toward the central area thereof.

References Cited in the file of this patent
UNITED STATES PATENTS

| | | |
|---|---|---|
| 413,606 | Mefford | Oct. 22, 1889 |
| 631,615 | Brown | Aug. 22, 1899 |
| 1,767,012 | Pfau | June 24, 1930 |